July 10, 1951

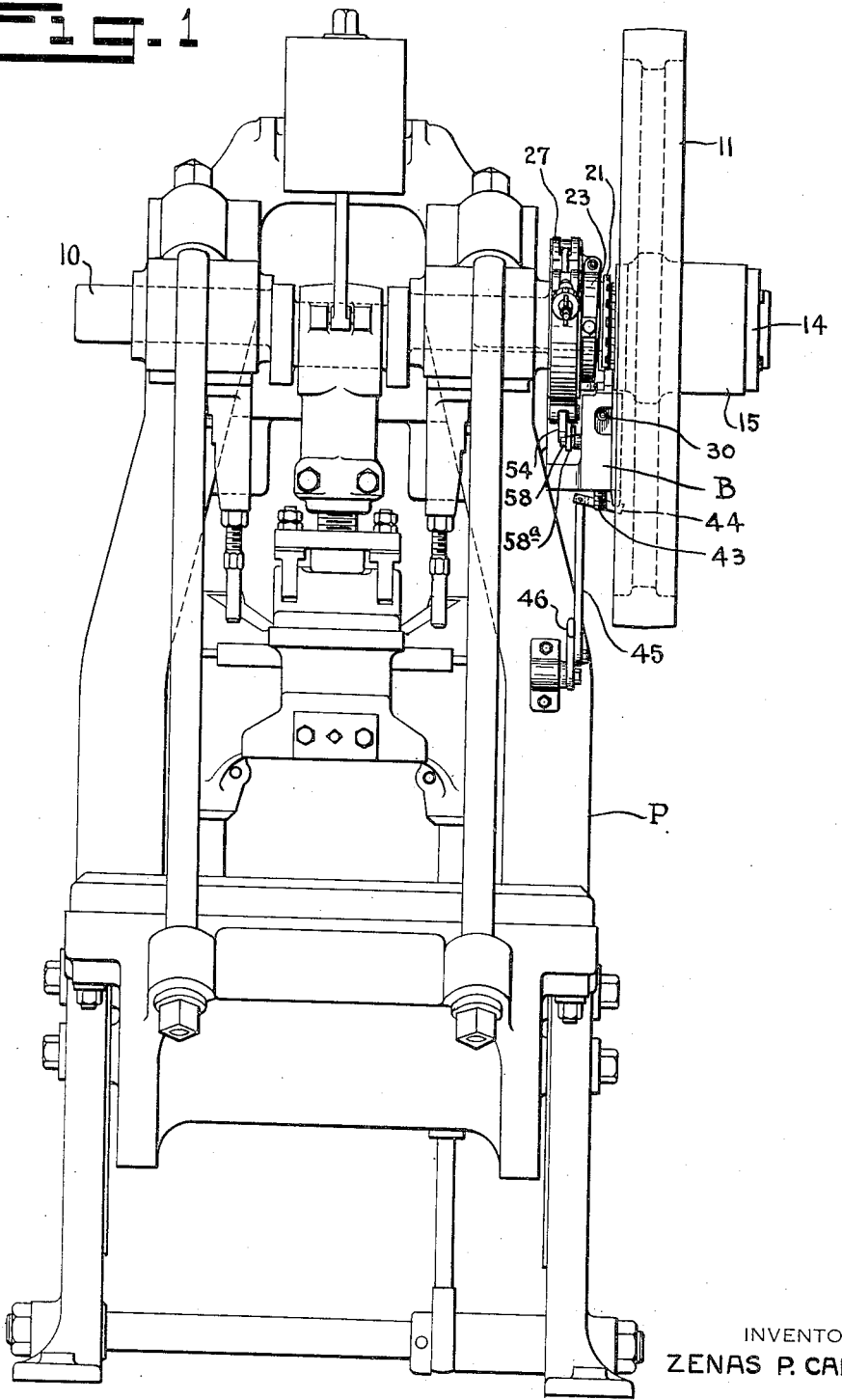

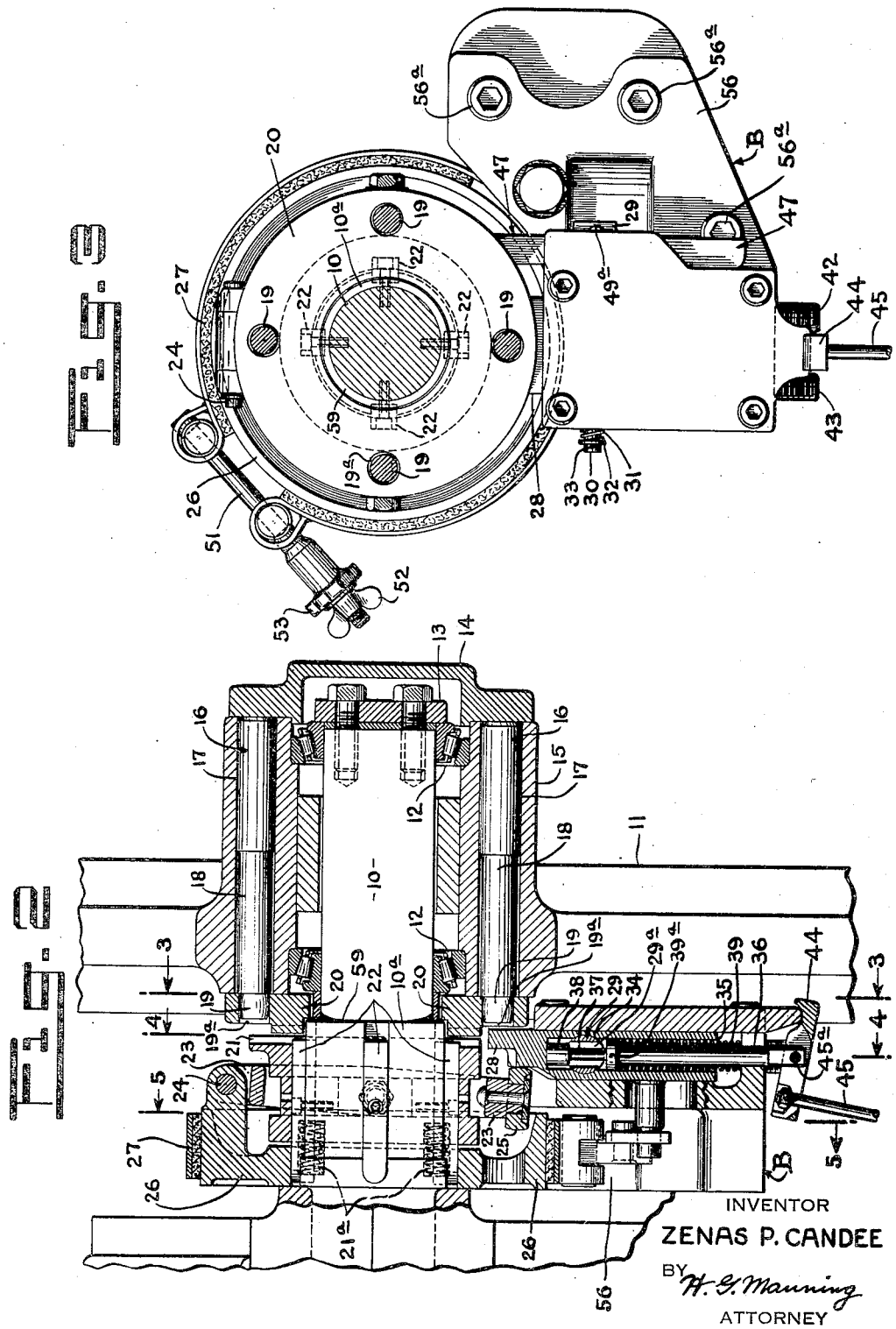

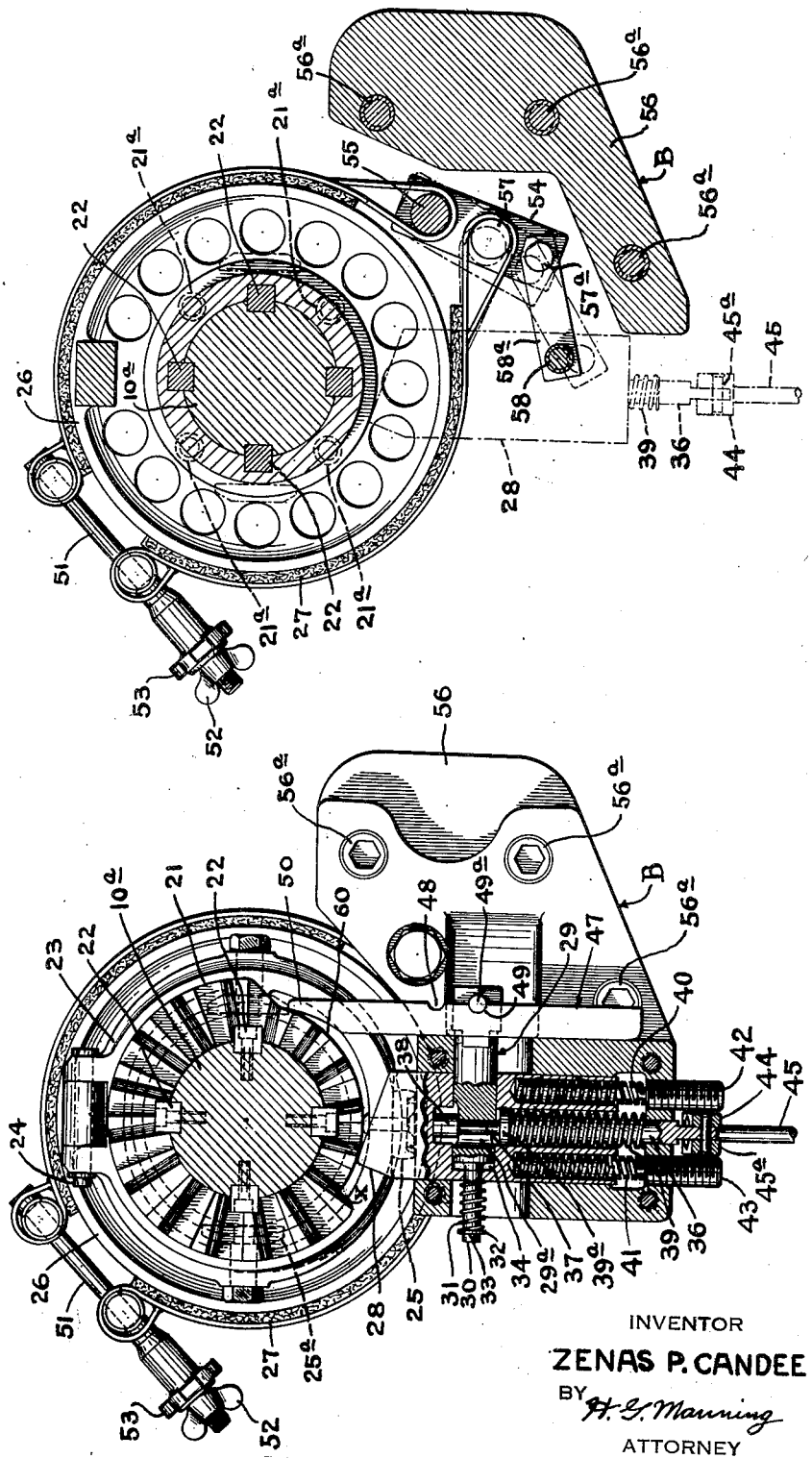

Z. P. CANDEE 2,559,709

POSITIVE JAW CLUTCH FOR POWER PRESSES

Filed June 26, 1947

INVENTOR
ZENAS P. CANDEE
BY
H. G. Manning
ATTORNEY

July 10, 1951  Z. P. CANDEE  2,559,709
POSITIVE JAW CLUTCH FOR POWER PRESSES
Filed June 26, 1947  5 Sheets-Sheet 5
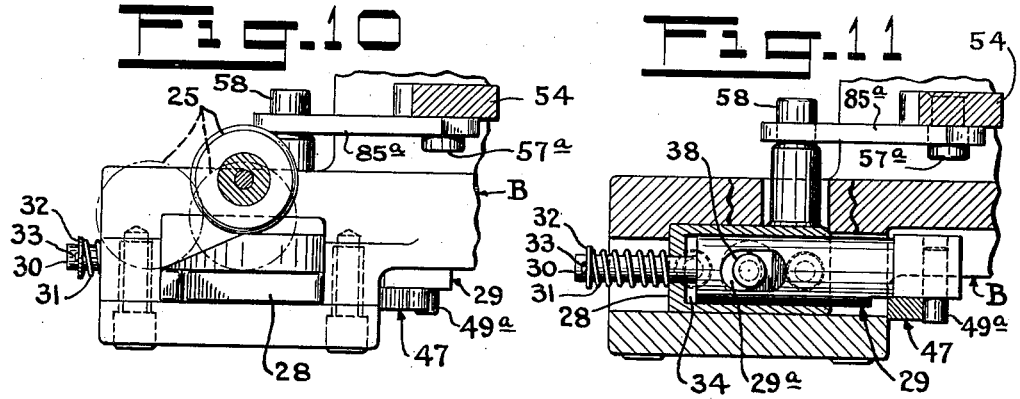
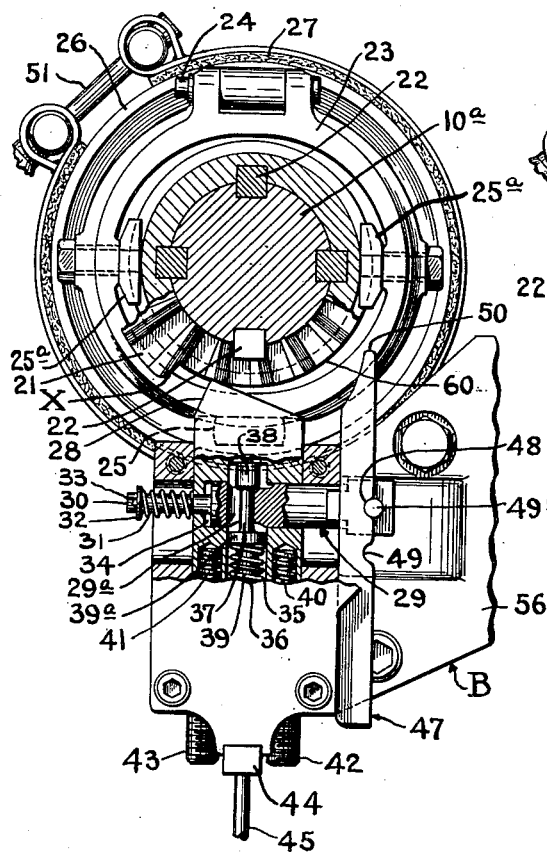
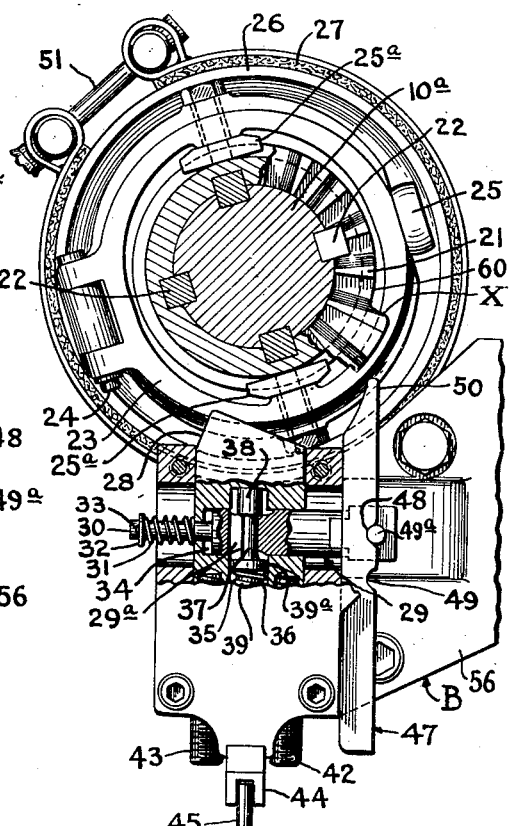
INVENTOR
ZENAS P. CANDEE
BY
*H. G. Manning*
ATTORNEY Patented July 10, 1951

2,559,709

UNITED STATES PATENT OFFICE 2,559,709

POSITIVE JAW CLUTCH FOR POWER PRESSES

Zenas P. Candee, Watertown, Conn., assignor to The Waterbury Farrel Foundry & Machine Company, Inc., Waterbury, Conn., a corporation of Connecticut Application June 26, 1947, Serial No. 757,227

14 Claims. (Cl. 192—17)

This invention relates to clutches, and more particularly to a positively-operated jaw clutch for quickly starting a power press.

One object of the present invention is to provide a positive clutch of the above nature having a "floating" driving jaw of limited flexibility to absorb the shock of starting the driven jaw and which will be self-aligning to compensate for minor inaccuracies in the machining of said jaws.

A further object is to provide a power press clutch of the above nature in which a floating jaw plate is secured to a plurality of self-centering spring plugs located within the hub of a driving member such as a fly wheel so that said driving plate will be resiliently restricted to permit a limited lateral or axial motion with respect to said driving member.

A further object is to provide a power press clutch of the above nature having a yoke member provided with two diametrically opposed blocks for engaging the sliding clutch jaw on both sides with a balanced action so as to avoid cramping of said blocks and thus facilitate the operation thereof.

A further object is to provide a power press clutch of the above nature which is provided with automatic control means to stop the press at an approximately predetermined position of the flywheel at each operation thereof.

A further object is to provide a jaw clutch of the above nature having mechanism which with simple adjustments will alternatively set the press to operate continuously or for only a single revolution.

A further object is to provide a machine of the above nature having an improved form of band brake which will automatically be tightened upon the brake drum whenever the clutch jaws are disengaged for stopping the press.

A still further object is to provide a machine of the above nature in which the block-carrying yoke for operating the slidable jaw rotates with the driven shaft, so that there can be little or no wear on the blocks thereof.

A further object is to provide a machine of the above nature, which will be relatively simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawings,

Fig. 1 represents a front elevation of a power press upon which the improved positive-jaw clutch has been installed.

Fig. 2 is a fragmentary longitudinal sectional view, on a larger scale, of a portion of the fly wheel, clutch, and brake mechanisms, taken along the axis of the fly wheel shaft—with the press shown in "stopped" position.

Fig. 3 is a cross-sectional view of the same, taken along the line 3—3 of Fig. 2, looking in the direction of the arrows.

Fig. 4 is a cross sectional view, taken along the line 4—4 of Fig. 2, and showing the construction of the sliding clutch jaw.

Fig. 5 is a cross-sectional view of the same, taken along the line 5—5 of Fig. 2, showing in full and dotted lines, respectively, the "stopped" and "running" positions of the brake band and operating linkage therefor.

Fig. 10 is a fragmentary plan view, partly in section, of a portion of the clutch mechanism showing the roller and clutch yoke being cammed outwardly by the trip slide to disengage the clutch jaws.

Fig. 11 is a cross-sectional view of the same, showing the interior construction thereof.

Figs. 12 and 13 are cross-sectional views, similar to Fig. 4, showing the pin on the horizontal catch plunger located in the upper slot of the latch lever to permit the continuous revolution of the press, and showing the catch plunger in "stopping" and "running" positions, respectively.

Figure 6:
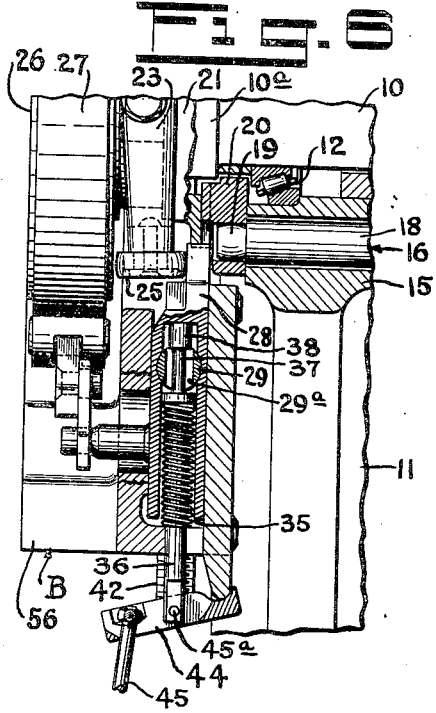
Fig. 6 is a fragmentary sectional view of the same, taken at right angles to Figs. 3, 4, and 5, and showing the appearance of the mechanism when the clutch jaws are engaged with each other.
Figure 7:
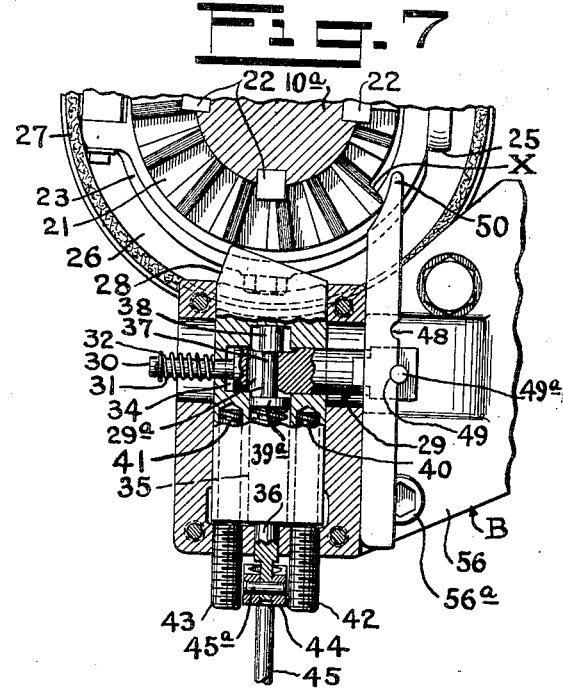
Fig. 7 is a fragmentary sectional view of the same, at right angles to Fig. 6 when the mechanism is set to operate for a single revolution, as it appears just as the latch lever starts to release the trip slide.

With the short length of the annular driven jaw which is the necessary construction on an ordinary power press, there is a considerable tendency for cramping of said jaw on its shaft when disengaged from the driving jaw. By means of the present invention, this cramping has been entirely eliminated by providing a yoke carrying two balancing blocks which engage the sliding driven jaw on both sides. The yoke also carries a roll intermediate the blocks which is adapted to be engaged by the trip slide for moving the driven jaw away from the driving jaw to stop the press.

An important feature of this invention is the provision of a latch lever-operated mechanism for keeping the trip slide down out of engagement with the driven jaw of the clutch when continuous operation is desired, and for causing the yoke roller to engage the driven jaw of the clutch to stop the press at the end of a single revolution of the fly wheel when the trip slide is in its upper "single-operation" position.

Thus, when it is desired to permit the press to run continuously, it is merely necessary to adjust the catch pin on the cross plunger in such a manner that it is located in the upper notch on the latch lever, whereupon said trip slide will be prevented from rising and stopping the press until the hand lever is released.

A further feature of the invention is the mechanism for resiliently holding the driving jaw resiliently attached to the fly wheel, comprising a series of stiff spring dowel pins, which are driven tightly into the fly wheel for part of their length, said fly wheel having clearance holes to permit the other ends of said pins to absorb the shocks from the clutch when the jaws come into engagement.

The driving jaw thus has a slight lateral or axial floating action, so that even if there is some slight inaccuracy of the machining of the jaws, the clutch will be self-centering when the jaws are pressed together.

Referring now to the drawings in which like reference numerals denote corresponding parts throughout the several views, the numeral 10 indicates a continuously-driven shaft of a punch press P having a belt-driven fly wheel 11 at one end thereof, said shaft 10 having an enlarged section 10a.

As clearly shown in Fig. 2, the fly wheel 11 is provided with a hub 15 mounted on anti-friction bearings 12 which are held in operating position by means of an end cap 13, and provided with a cover plate 14.

Located within the hub 15 are a plurality of stepped spring plugs or dowel pins 16 (four in this instance), which are driven tightly into cylindrical holes 17, passing through said hub, and which pins have reduced resilient sections 18 to provide a clearance at the inner ends of the holes 17.

The dowel pins 16 are also provided with reduced rounded ends 19, which are adapted to fit tightly within corresponding cylindrical apertures 19a in a floating ring-shaped driving jaw 20 of the clutch, which jaw 20 is adapted to be engaged by a similarly-shaped sliding driven jaw 21 whenever the press is in operation. The sliding driven jaw 21 is held non-rotatively on the enlarged section 10a of the shaft 10 by four keys 22 (see Fig. 13).

The sliding driven jaw 21 is normally pressed toward the driving jaw 20 by means of a plurality of horizontal coil springs 21a.

Provision is also made of a rotative ring-shaped yoke 23 pivoted at one end upon a pin 24 carried by an internal brake drum 26 secured to the enlarged section 10a of the shaft 10 and embraced by a brake band 27—said yoke having a rounded-edged roller 25 diametrically opposite the pivot pin 24 and being engageable by a vertical trip slide 28 for operating the clutch. The yoke 23 carries a pair of blocks 25a for engaging the sliding driven jaw 21 to open the clutch.

The trip slide 28 is normally held in its lowermost position by means of a horizontal catch plunger 29 mounted in a cross hole 34 in said slide. The plunger 29 has a vertical hole 29a therein, for a purpose to be described later, and also has a reduced outer end 30 embraced by a coiled spring 31 which engages a washer 32 held in place on said catch plunger 29 by a cotter pin 33.

The trip slide 28 is also provided with a vertical bore 35 intersecting the horizontal cross hole 34, and within which is a vertical trip bolt 36 having a reduced intermediate section 37 and a cylindrical top head 38 which is located in the upper part of the vertical bore 35.

Provision is also made of a vertical coiled spring 39 embracing the lower end of the trip bolt 36 and pressing upwardly against a collar 39a of said bolt 36 located below the reduced section 37 thereof.

The trip slide 28 is also pressed upwardly by a pair of outer vertical coiled springs 40, 41 which may be adjusted by means of a pair of set screws 42, 43 located therebeneath and mounted in a fixed bracket B.

In order to operate the clutch, provision is made of a short lever link 44 (Figs. 1, 2, and 6) connected to the lower end of the trip bolt 36 by means of a pin 45a (Fig. 8), said link 44 being attached at its outer end to a depending rod 45, which is connected to a hand lever 46 mounted on the body of the press P.

Provision is also made of a substantially vertical latch lever 47 having a pair of vertically-spaced side notches 48, 49, which are adapted to be selectively engaged by a horizontal pin 49a extending from one end of the catch plunger 29.

The latch lever 47 has a tapered upper end 50 adapted to be engaged by a steeply inclined radial bump shoulder X located at the end of a recess 60 formed in the driven clutch jaw 21. The bump shoulder X serves to force the latch lever 47 clockwise and thereby move the cross catch plunger 29 laterally until the bore 29a lines up with the head 38 on the pin 36. This will permit upward movement of the trip slide under the action of the springs 40, 41 for stopping the press even though the hand lever 46 may still be held down.

The brake band 27 is adapted to be adjusted by means of a screw 51 and held in adjustment by means of a pair of nuts 52, 53 (see Fig. 3).

In order to apply the brake band 27 frictionally to the brake drum 26 automatically whenever the clutch is opened, provision is made of a toggle brake lever 54 (Figs. 5, 10, and 11) pivoted on a horizontal pin 55 (Fig. 5) connected to the clutch bracket section 56 (B)—the latter being attached to the frame of the press P by three bolts 56a, as clearly shown in Fig. 5.

The toggle brake lever 54 is connected by means of a pin 57 (Fig. 5) to one end of the brake band 27, and by the pin 55 to the other end of said brake band. At the lower end of the toggle lever 54, provision is made of a pin 57a connected to the trip slide 28 by means of a toggle link 58a, and a pin 58 on said slide, whereby the brake will be operated whenever the trip slide 28 is moved upwardly to open the clutch.

Figure 8:
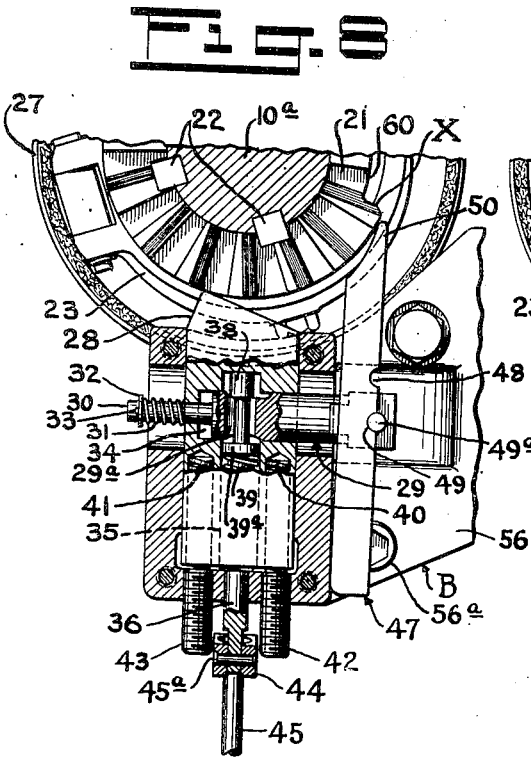
Fig. 8 is a view similar to Fig. 7, showing the appearance of the clutch after the latch lever has been swung outwardly to permit the upward movement of the trip slide for stopping the press.
Figure 9:
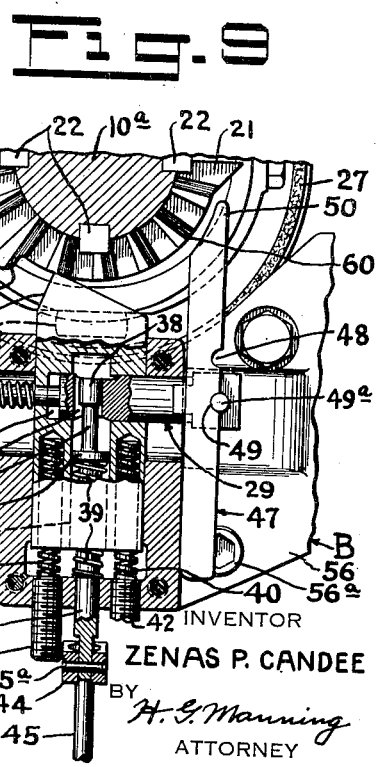
Fig. 9 is a similar view of the same, showing the appearance of the machine after the trip slide has moved upwardly and has cammed the yoke roller laterally to force the driven jaw of the clutch away from the driving jaw thereof for stopping the press.

An important safety feature of the invention is that when the parts are in the "single-revolution" position shown in Figs. 8 and 9, if the brake band 27 should for any reason fail to function, the shoulder projection X on the edge of the sliding driven jaw 21 will engage the top of the trip slide 28 and positively stop the press.

The driving jaw 20 is held loosely against a shoulder 59 on the shaft 10 at the end of the enlarged section 10a thereof (see Fig. 2).

Continuous operation

With the press set for continuous operation, as shown in Figs. 12 and 13 when the operator presses down on the hand lever 46, the rod 45 will be depressed, pulling down the central trip bolt 36 which rests on the ledge on the top of the cross catch plunger 29, and consequently the trip slide 28 will also be pulled down.

It will be understood that the vertical trip bolt 36 and the trip slide 28 will move downward as a unit compressing the three vertical springs 39, 40, 41 and causing the upper cam surface of the trip slide 28 to move down out of alignment with the yoke roller 25. The sliding driven jaw 21 will then be forced to the right by the horizontal springs 21a (Fig. 2) into engagement with the floating driving jaw 20 and thus starting the rotation of the shaft 10. The press will then run continuously until the operator releases the hand lever 46, whereupon the rod 45 and the trip bolt 36 will be forced upwardly by the springs 39, 40, 41 to their original positions, as shown in Fig. 2. The trip slide 28 will then cam the roller 25 to the left, disengaging the sliding driven clutch jaw 21 from the floating driving jaw 20. This action always occurs at approximately the same point in the next revolution of the shaft 10.

At the same time that the trip slide 28 moves upwardly, the brake band 27 will be tightened about the brake drum 26 by the toggle action of the link 58a and the lever 54 (Fig. 5), the friction thus produced normally being sufficient to stop the machine.

It will be understood, however, that if the friction of the brake band on the brake drum fails to stop the press, the projection (X) of the sliding jaw (see Fig. 4) will strike the corner of the trip slide 28 and produce a positive stop.

It will also be understood that during continuous running, the latch lever 47 will be held down out of operation by the engagement of the pin 49a in the upper notch 48 of said latch lever, as shown in Figs. 12 and 13.

Single revolution operation

To set the press into condition for making only a single revolution for each depression of the hand lever 46, it will simply be necessary to push the cross catch plunger 29 to the right (as viewed in Figs. 12 and 13) to compress the coiled spring 31, and to then move the latch lever 47 upwardly so that the pin 49a of said plunger will be seated in the bottom notch 49 of said lever (see Figs. 4, 8, 9) instead of in the top notch 48 thereof.

When the hand lever 46 is then depressed, the rod 45 will pull down upon the trip slide 28 causing the head 38 of the trip bolt 36 to engage the cross catch plunger 29 and compress the springs 39, 40, 41, as before.

As the shaft 10 continues to revolve, the corner X of the sliding driven jaw 21 will engage the tapered upper end 50 of the latch lever 47 forcing said lever clockwise and moving the cross catch plunger 29 to the right until the vertical hole 29a of said plunger comes into alignment with the head 38 of the vertical trip bolt 36.

The trip bolt 36 will thus be disengaged from the ledge on the cross catch plunger 29 and the trip slide 28 will suddenly be pushed upwardly by the springs 40, 41 until it comes into the path of the roller 25 of the yoke 23. The roller 25 will thus be cammed to the left by the trip slide 28, disengaging the clutch jaws and causing the brake band 27 to tighten about the drum 26 to stop the press.

To make another revolution for producing an additional operation of the press, it will be necessary to raise the rod 45 by means of the hand lever 46 until the head 38 of the trip bolt 36 passes from the position shown in Fig. 9 to the position shown in Fig. 8 and again rests on top of the cross catch plunger 29. The mechanism will then be set for another single stroke of the press.

One advantage of this invention lies in the fact that the recess 60 of the sliding driven jaw 21 is quite short. The larger diameter portion of the jaw 21 thus serves to hold the trip slide 28 down and makes it impossible at ordinary speeds, due to the inertia of the parts, for the operator to depress the rod 45 quickly, and secure a second revolution before the press stops automatically in normal operation thereof.

This action, which is known in the trade as "pumping the clutch," and which in the past was often the cause of accidents and injury to the mechanism, is entirely prevented by the present invention.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a clutch for a power press having a fly wheel provided with a hub, an annular driving jaw connected to said hub, a shaft, a slidable annular driven jaw keyed to said shaft and adapted to engage said driving jaw, a brake drum secured to said shaft, an open annular yoke embracing said driven jaw and pivoted to said drum, said yoke carrying a roller which is movable in a circular path, a stationary cam element for engagement by said roller to move said driven jaw away from said driving jaw to open the clutch, means for shifting said cam element away from the path of said roller, a brake band surrounding said drum, and means to automatically contract said band upon said drum to stop the rotation of said shaft when said jaws are disengaged.

2. The invention defined in claim 1, in which said yoke and said driven jaw are connected by a pair of diametrically opposed blocks mounted internally of the yoke to prevent cramping of said jaw by said yoke.

3. The invention as defined in claim 1, which includes means selectively adjustable to automatically return said cam element to the path of said roller during the next revolution of the clutch to stop the machine, or to keep said cam element out of said path for continuous operation for as many revolutions as desired.

4. In a clutch for a power press having a fly wheel, an annular driving jaw resiliently connected to the hub of said fly wheel, a shaft in said hub, a slidable annular driven jaw keyed to said shaft and adapted to engage said driving jaw, a brake secured to said shaft, an open annular yoke embracing said driven jaw and pivoted to said brake, said yoke carrying a roller for movement in a circular path, a shiftable cam element for engagement by said roller to move said driven jaw from said driving jaw to open the clutch, means for shifting said cam element away from the path of said roller, and means to automatically actuate said brake to stop rotation of said shaft when said jaws are disengaged, and means to selectively restrain the action of said cam element for a single revolution or a plurality of revolutions as desired.

5. In a clutch mechanism, a pair of rotatable driving and driven jaws resiliently urged into engagement with each other, a swingable yoke rotatable with the driven jaw and connected thereto at diametrically opposite points for moving said driven jaw out of engagement with said driving jaw, a roller mounted on said yoke, a trip slide having a cam surface movable into and out of the path of said roller, and means for moving said trip slide, whereby it may be projected into the path of said roller to deflect it and cause disengagement of said jaws.

6. The invention as defined in claim 5, in which said means for moving the trip slide includes springs for urging said slide into the path of said roller, and means for withdrawing said slide from said path, said trip slide including a latch adapted to operatively connect said slide with said withdrawing means, and said mechanism including a shoulder on the driven jaw, and a lever connected to said latch and projecting into the path of said shoulder, whereby the rotation of the shoulder will disconnect the latch.

7. The invention defined in claim 5, including a brake drum secured for rotation with the driven jaw, a brake band adapted to grip said drum to stop rotation of said jaw, and linkage connecting said trip slide and said brake band whereby said brake band will grip said drum concurrently with movement of said trip slide into the path of said roller.

8. The invention as defined in claim 5, including a shoulder on the driven jaw, and an abutment on the trip slide, said abutment lying in the path of said shoulder when the trip slide lies in the path of said roller, thereby providing a positive stop against rotation of the driven jaw.

9. In a clutch, a support, a driven member rotatable in said support, and having a jaw slidably keyed thereto, a yoke pivoted to said driven member and provided with means including a pair of blocks engaging opposite sides of said jaw for sliding said jaw, a roller mounted on said yoke, and a cam member mounted on said support to lie in the path of said roller, whereby said cam member will be struck by said roller to move the yoke during rotation of said driven member.

10. In a clutch, a support, a driven member rotatable in said support and having a jaw slidably keyed thereto, a jaw-sliding yoke including a projecting roller mounted on said driven member to rotate therewith, and a trip slide mounted on said support and movable into and out of the path of said roller, whereby said slide when disposed in the path of said roller will deflect the roller to slide said jaw.

11. The invention as defined in claim 10, wherein said driven member includes a brake arm, a brake band surrounding said drum, and a linkage between said trip slide and said brake band for contracting the band concurrently with movement of the trip slide into the path of said roller.

12. The invention as defined in claim 11 further including a radial shoulder on said jaw, said trip slide lying in the path of said roller and projecting also into the path of said radial shoulder, whereby said slide and shoulder will provide a positive stop regardless of the operation of the brake band.

13. The invention as defined in claim 10, including means for moving said trip slide into and out of the path of said roller, said means comprising a spring normally urging said slide into said path, a trip bolt having an operating rod secured thereto, a cross-catch plunger mounted in said trip slide and adapted to latch with said trip bolt, thereby operatively connecting said trip slide with said trip bolt for withdrawing said slide from said path, a radial shoulder on said jaw, and a latch lever connected to said cross-catch plunger and adapted to project into the path of said shoulder, whereby said latch lever will be struck by said radial shoulder to disengage said cross-catch plunger from said trip bolt to cause said spring to move said trip slide into the path of said roller.

14. The invention as defined in claim 10, in which said yoke includes means engaging said jaw at opposite sides thereof, whereby cramping of said jaw will be avoided when operated by said yoke.

ZENAS P. CANDEE.

REFERENCES CITED

The following references are of record in the file of this patent:

UNITED STATES PATENTS

| Number | Name | Date |
|---|---|---|
| 448,578 | Craig | Mar. 17, 1891 |
| 489,279 | White | Jan. 3, 1893 |
| 685,353 | Scott | Oct. 29, 1901 |
| 712,644 | Blackhall | Nov. 4, 1902 |
| 1,194,379 | Gouldbourn et al. | Aug. 15, 1916 |
| 1,687,035 | Newhouse | Oct. 9, 1928 |

FOREIGN PATENTS

| Number | Country | Date |
|---|---|---|
| 722,370 | France | Dec. 29, 1931 |